United States Patent
Raya et al.

(10) Patent No.: US 12,038,083 B2
(45) Date of Patent: Jul. 16, 2024

(54) AXLE ASSEMBLY HAVING A LUBRICANT DEFLECTOR

(71) Applicant: ArvinMeritor Technology, LLC, Troy, MI (US)

(72) Inventors: Dhanapal Vittala Raya, Troy, MI (US); Mark Smith, Troy, MI (US); Kristen G. Byrd, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 55 days.

(21) Appl. No.: 17/846,255

(22) Filed: Jun. 22, 2022

(65) Prior Publication Data

US 2023/0417316 A1    Dec. 28, 2023

(51) Int. Cl.
*F16H 57/04*    (2010.01)
*F16H 57/037*    (2012.01)

(52) U.S. Cl.
CPC ....... *F16H 57/0483* (2013.01); *F16H 57/037* (2013.01); *F16H 57/0423* (2013.01)

(58) Field of Classification Search
CPC . F16H 57/0483; F16H 57/037; F16H 57/0423
USPC ........................................................ 475/160
See application file for complete search history.

(56) References Cited

U.S. PATENT DOCUMENTS

| | | | |
|---|---|---|---|
| 2,182,889 A | 12/1939 | Carlson et al. | |
| 6,267,203 B1 * | 7/2001 | Brissette | F16H 57/0483 184/6.12 |
| 8,858,379 B2 | 10/2014 | Keeney et al. | |
| 2012/0285290 A1 * | 11/2012 | Gooden | F16H 57/0483 74/606 A |
| 2019/0054816 A1 | 2/2019 | Garcia et al. | |
| 2019/0054817 A1 | 2/2019 | Garcia et al. | |
| 2019/0054818 A1 | 2/2019 | Garcia et al. | |
| 2020/0173494 A1 | 6/2020 | Smith et al. | |
| 2020/0173531 A1 | 6/2020 | Smith | |
| 2020/0173535 A1 | 6/2020 | Peng et al. | |
| 2020/0173537 A1 | 6/2020 | Begov et al. | |
| 2020/0173541 A1 | 6/2020 | Soffner et al. | |
| 2020/0177049 A1 | 6/2020 | Raya et al. | |
| 2020/0177059 A1 | 6/2020 | Smith et al. | |

FOREIGN PATENT DOCUMENTS

JP    2004204949 A    7/2004

OTHER PUBLICATIONS

Extended European Search Report dated Dec. 5, 2022 for related European Appln. No. 22182239.8; 13 Pages.

* cited by examiner

*Primary Examiner* — Colby M Hansen
(74) *Attorney, Agent, or Firm* — Brooks Kushman PC

(57) ABSTRACT

An axle assembly having a differential carrier, a differential assembly, and a lubricant deflector. The differential assembly is mounted to the differential carrier and is rotatable about a differential axis. The lubricant deflector is mounted to the differential carrier and directs lubricant that is splashed or sprayed by a ring gear of the differential assembly into a lubricant passage of the differential carrier.

20 Claims, 5 Drawing Sheets

AXLE ASSEMBLY HAVING A LUBRICANT DEFLECTOR

TECHNICAL FIELD

This relates to an axle assembly that has a lubricant deflector.

BACKGROUND

An axle assembly having a differential assembly is disclosed in U.S. Patent Publication No. 2019/0054816.

SUMMARY

In at least one embodiment an axle assembly is provided. The axle assembly includes the housing assembly, a differential assembly, a drive pinion, and a lubricant deflector. The housing assembly includes an axle housing and a differential carrier. The differential carrier is mounted to the axle housing and defines a lubricant passage. The axle housing and the differential carrier cooperate to define a sump portion that receives lubricant. The differential assembly is mounted to the differential carrier. The differential assembly is rotatable about a differential axis. The differential assembly has a ring gear. The drive pinion meshes with the ring gear. The lubricant deflector is mounted to the differential carrier. The lubricant deflector directs lubricant that is splashed by the ring gear or sprayed by the ring gear into the lubricant passage.

The lubricant deflector may direct lubricant that is splashed or sprayed by the ring gear into the lubricant passage when the differential assembly rotates about the differential axis in a first rotational direction. Teeth of the ring gear may rotate from the sump portion, then into engagement with the drive pinion, then disengage the drive pinion, and then rotate toward the lubricant deflector when the differential assembly rotates in the first rotational direction.

The drive pinion may be rotatable about an axis. The lubricant deflector may be positioned above the axis.

The lubricant deflector may have a first panel. The first panel may be mounted to the differential carrier. The first panel may have an arcuate edge. The arcuate edge may be radially disposed with respect to the axis.

The lubricant deflector may have a second panel. The second panel may extend at an oblique angle with respect to the first panel. The second panel may extend in a direction that extends away from the drive pinion. The second panel may define an opening. The ring gear may pass through the opening when the differential assembly rotates. The second panel may have a first arm. The second panel may have a second arm. The second arm may be remotely positioned from the first arm. The first arm and the second arm may be disposed opposite each other. The first arm and the second arm may partially define the opening.

The lubricant deflector may have an upper panel. The upper panel may be disposed above the second panel. The upper panel may be spaced apart from the second panel.

The lubricant deflector may have a first connecting arm. The first connecting arm may extend from the first arm. The first connecting arm may extend from an end of the first arm to the upper panel. The first panel may be disposed substantially parallel to the first connecting arm.

The lubricant deflector may have a second connecting arm. The second connecting arm may extend from the second arm. The second connecting arm may extend from an end of the second arm to the upper panel. The first panel may be disposed substantially parallel to the second connecting arm. The ring gear may be positioned between the first connecting arm and the second connecting arm.

The upper panel may have a flange. The flange may extend away from the first panel. The flange may extend from an end of the upper panel that may be disposed opposite the first connecting arm and the second connecting arm.

The lubricant deflector may have a first side panel. The first side panel may extend from the first panel. The first side panel may extend from the first panel in a direction that extends away from the lubricant passage of the differential carrier. The first side panel may contact the upper panel. For instance, the first side panel may have a first flange that may engage an upper side of the upper panel. The upper side may face away from the drive pinion.

The first side panel may have a first distal end. The first distal end may be disposed opposite the first panel. The first connecting arm may be positioned farther from the first panel than the first distal end is positioned from the first panel.

The lubricant deflector may have a second side panel. The second side panel may be disposed opposite the first side panel. The second side panel may extend from the first panel. The second side panel may extend from the first panel in a direction that extends away from the lubricant passage of the differential carrier. The second side panel may contact the upper panel. For instance, the second side panel may have a second flange that may engage the upper side of the upper panel. The second side panel may extend from the arcuate edge of the first panel.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
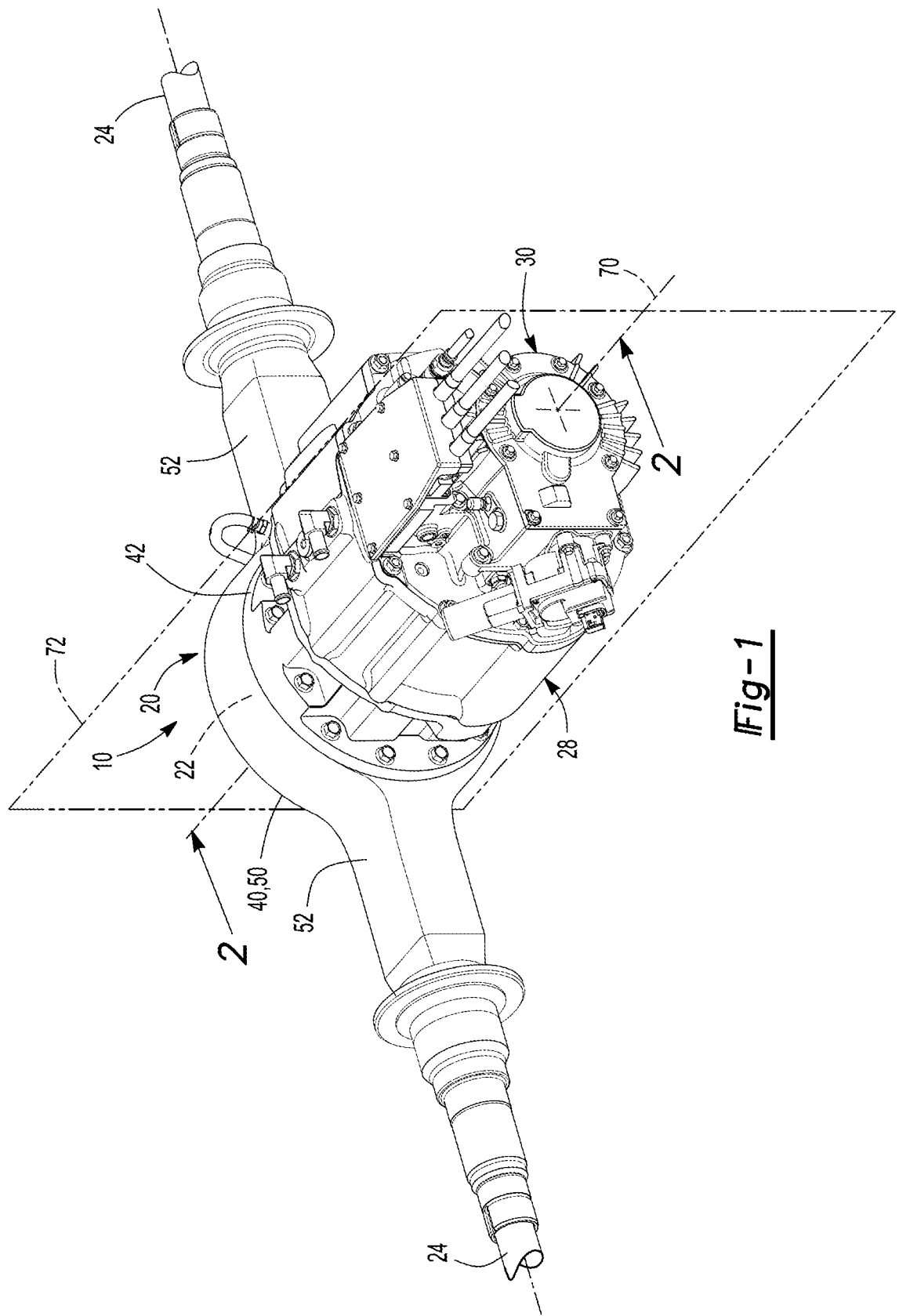
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 2:
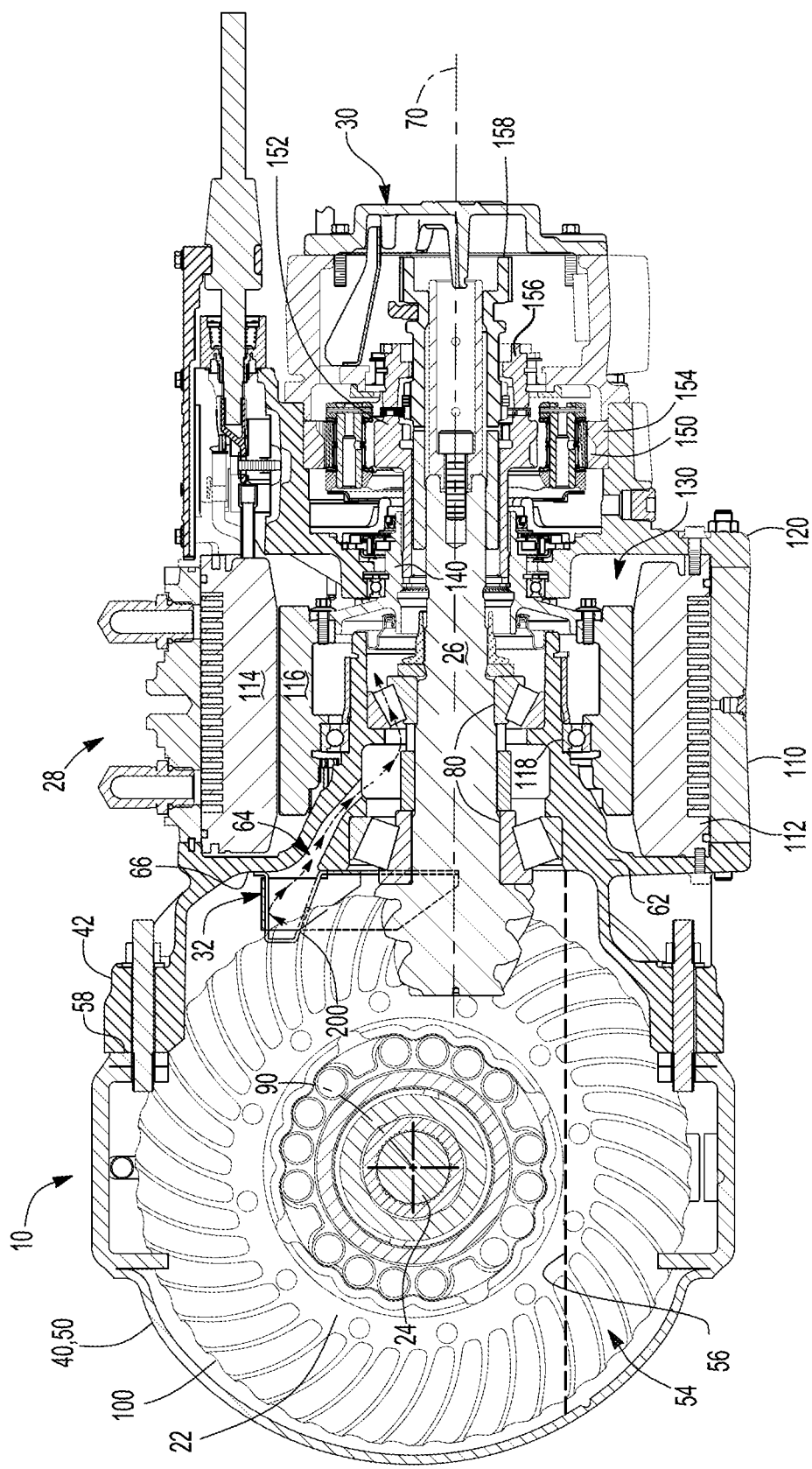
FIG. 2 is a section view of the axle assembly along section line 2-2.

One or more axle assemblies may be provided with the vehicle. As is best shown with reference to FIGS. 1 and 2, the axle assembly 10 includes a housing assembly 20, a differential assembly 22, and at least one axle shaft 24. As is best shown in FIG. 2, the axle assembly 10 may include a drive pinion 26, a torque source 28, a gear reduction module 30, and a lubricant deflector 32.

Referring to FIG. 1, the housing assembly 20 receives various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 at least partially defines a sump portion 54 that may contain or collect lubricant 56. Lubricant 56 in the sump portion 54 may be splashed or sprayed by a ring gear 100 of the differential assembly 22 and distributed to lubricate various components.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt or stud, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. Each arm portion 52 may support a wheel hub and a brake assembly that is configured to brake the wheel hub and hence brake a wheel that is mounted to the wheel hub. An arm portion 52 or a portion thereof may or may not be integrally formed with the center portion 50. It is also contemplated that the arm portions 52 may be omitted.

Figure 3:
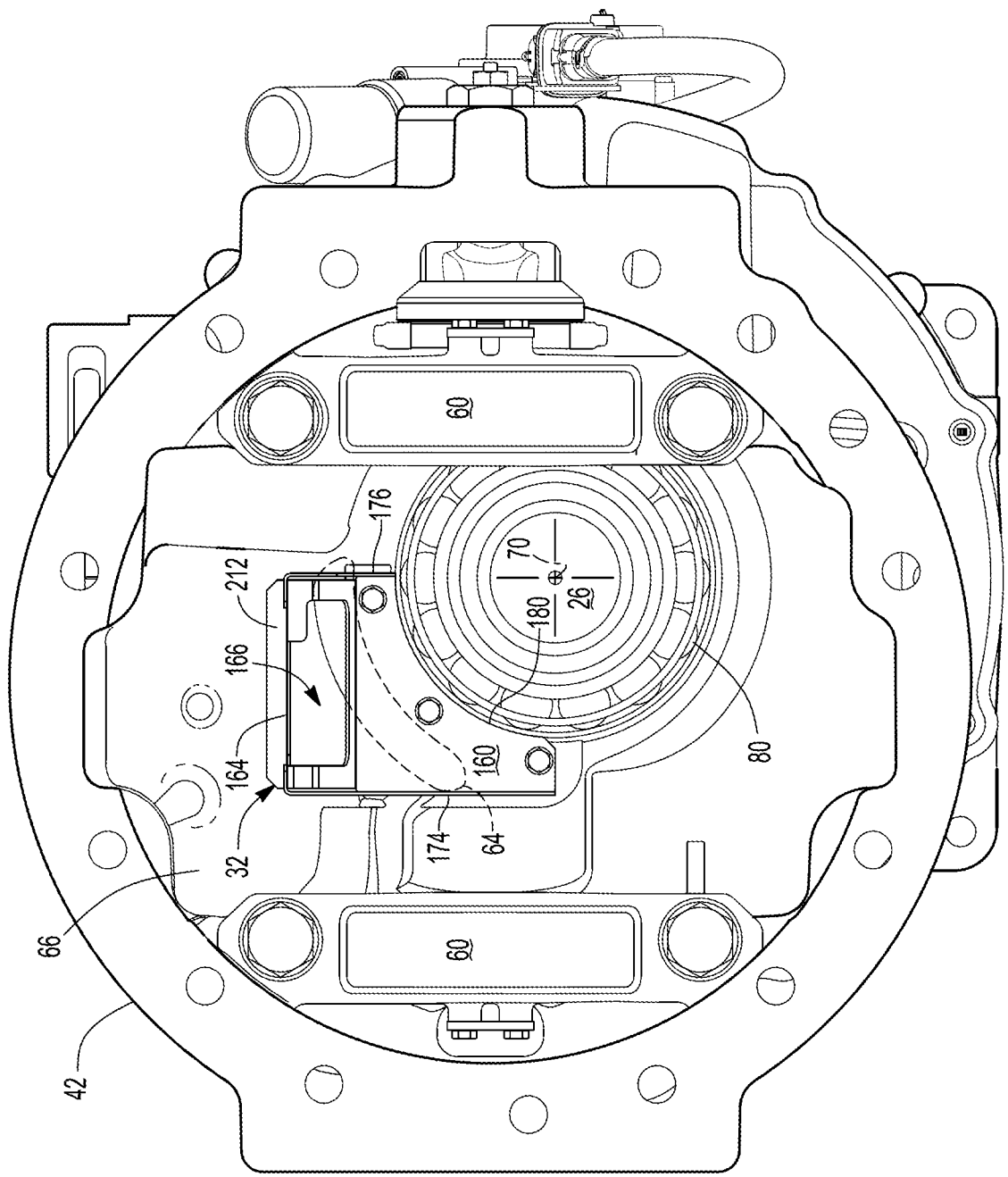
FIG. 3 is a side view of a portion of the axle assembly with the axle housing and the differential assembly omitted to better show a lubricant deflector.

Referring to FIGS. 1 and 2, the differential carrier 42 may be mounted to the center portion 50 of the axle housing 40. The differential carrier 42 supports the differential assembly 22. For example, the differential carrier 42 may include one or more bearing supports 60 (which are best shown in FIG. 3 without the differential assembly 22) that may support a bearing like a roller bearing assembly that may rotatably support the differential assembly 22. The differential carrier 42 may cooperate with the axle housing 40 to define the sump portion 54. In at least one configuration, the differential carrier 42 may include a bearing support wall 62 and a lubricant passage 64.

Referring to FIG. 2, the bearing support wall 62 supports bearings that rotatably support other components of the axle assembly 10. For example, the bearing support wall 62 may support bearings that may rotatably support a drive pinion 26, bearings that may rotatably support a rotor of an electric motor, or both. The bearing support wall 62 may extend in an axial direction away from the axle housing 40 and may extend around and encircle an axis 70. The bearing support wall 62 may define a hole that may extend along or around the axis 70 and receive the drive pinion 26 and the bearings that rotatably support the drive pinion 26. The bearing support wall 62 may be integrally formed with the differential carrier 42 or may be a separate component that is secured to or fastened to the differential carrier 42. The bearing support wall 62 may have a side 66 that faces toward the differential assembly 22. The side 66 may be disposed generally perpendicular to the axis 70. The location of the section view in FIG. 2 is shown in FIG. 1 and is in a plane 72 in which the axis 70 is disposed. The plane 72 is perpendicular to the axis 70 and extends vertically from the axis 70.

Referring to FIGS. 2 and 3, the lubricant passage 64 may extend through the bearing support wall 62. For instance, the lubricant passage 64 may extend from the side 66 of the bearing support wall 62 in a direction that extends away from the differential assembly 22. In addition, the lubricant passage 64 may be located above the axis 70 and the drive pinion 26 and may extend in a downward direction or at an angle from the side 66 toward the axis 70. As such, lubricant 56 that enters the lubricant passage 64 may flow downward under the force of gravity. The lubricant passage 64 may include one or more outlets. For instance, an outlet may be located between a pair of bearing assemblies 80 that rotatably support the drive pinion 26. The bearing assemblies 80 may encircle the drive pinion 26 and may be encircled by the bearing support wall 62. It is also contemplated that another outlet may be provided farther from the differential assembly 22 to help route lubricant 56 more directly to the gear reduction module 30.

The differential assembly 22 is mounted to the differential carrier 42. The differential assembly 22 is received in the center portion 50 of the housing assembly 20. The differential assembly 22 is rotatable about a differential axis 90.

The differential axis 90 may be disposed substantially perpendicular to the axis 70. The term "substantially perpendicular" is used herein to designate features or axes that are the same as or very close to perpendicular and includes features that are within ±3° of being perpendicular each other. The differential axis 90 may be the same as the wheel axis or may differ from the wheel axis.

The differential assembly 22 transmits torque between the torque source 28 and the axle shafts 24. For instance, the differential assembly 22 may transmit torque to the axle shafts 24, wheel hubs, and wheels of the vehicle. The differential assembly 22 may be operatively connected to the axle shafts 24 and may permit the axle shafts 24 to rotate at different rotational speeds in a manner known by those skilled in the art. The differential assembly 22 has a ring gear 100 that may have teeth that are arranged around the differential axis 90 and that engage the drive pinion 26. Accordingly, the differential assembly 22 may receive torque from the drive pinion 26 via the ring gear 100 and transmit torque to the axle shafts 24.

Referring primarily to FIG. 1, the axle shafts 24 transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the wheel axis or the differential axis 90, which may or may not be coaxially disposed. As an example, an axle shaft 24 may have a first end and a second end. The first end may be operatively connected to the differential assembly 22. The second end may be disposed opposite the first end and may be operatively connected to a corresponding wheel hub. Optionally, gear reduction may be provided between an axle shaft 24 and a wheel.

Referring to FIG. 2, the drive pinion 26 is operatively connectable to the torque source 28. In addition, the drive pinion 26 may engage or mesh with the ring gear 100. For instance, the drive pinion 26 may have a gear portion that has teeth that may mesh with teeth of the ring gear 100. The drive pinion 26 may also have a shaft portion that extends from the gear portion. In an axle assembly that includes a gear reduction module 30, the drive pinion 26 may operatively connect the gear reduction module 30 to the differential assembly 22. In at least one configuration, the drive pinion 26 may be rotatable about the axis 70 and may be rotatably supported inside another component, such as the bearing support wall 62.

Referring primarily to FIG. 2, at least one torque source 28 may be provided with the axle assembly 10 or may be connected to the axle assembly 10. The torque source 28 may provide torque to the differential assembly 22 via the drive pinion 26 and a gear reduction module 30 as will be discussed in more detail below. A torque source 28 may be of any suitable type, such as an electric motor, an internal combustion engine, or combinations thereof. In the configuration shown, the torque source 28 is illustrated as being an electric motor or electric motor module that is mounted to the differential carrier 42. The electric motor module is illustrated as being disposed between the differential assembly 22 and the gear reduction module 30; however, other configurations are contemplated, such as providing the electric motor module and the gear reduction module 30 on opposite sides of the differential assembly 22. In at least one configuration, the electric motor module may include a motor housing 110, a coolant jacket 112, a stator 114, a rotor 116, at least one rotor bearing assembly 118, and a cover 120.

The motor housing 110 may extend between the differential carrier 42 and the cover 120. The motor housing 110 may be mounted to the differential carrier 42 and the cover 120. The motor housing 110 may extend around the axis 70 and may define a motor housing cavity 130.

The coolant jacket 112 may help cool or remove heat from the stator 114. The coolant jacket 112 may be received in the motor housing cavity 130 of the motor housing 110 and may encircle the stator 114.

The stator 114 may be encircled by the motor housing 110 and may be received in the motor housing cavity 130. The stator 114 may be fixedly positioned with respect to the coolant jacket 112. For example, the stator 114 may extend around the axis 70 and may include stator windings that may be received inside and may be fixedly positioned with respect to the coolant jacket 112.

The rotor 116 may extend around and may be rotatable about the axis 70. The rotor 116 may be received inside the stator 114, the coolant jacket 112, and the motor housing cavity 130 of the motor housing 110. The rotor 116 may be rotatable about the axis 70 with respect to the differential carrier 42 and the stator 114. In addition, the rotor 116 may be spaced apart from the stator 114 but may be disposed in close proximity to the stator 114. The rotor 116 may extend around and may be supported by the bearing support wall 62.

One or more rotor bearing assemblies 118 may rotatably support the rotor 116. For example, a rotor bearing assembly 118 may encircle the bearing support wall 62 of the differential carrier 42 and may be received inside of the rotor 116.

The rotor 116 may be operatively connected to the drive pinion 26. For instance, a coupling such as a rotor output flange 140 may operatively connect the rotor 116 to the gear reduction module 30, which in turn may be operatively connectable with the drive pinion 26.

The cover 120 may be mounted to the motor housing 110 and may be disposed opposite the axle housing 40 and the differential carrier 42. For example, the cover 120 may be mounted to an end of the motor housing 110 that may be disposed opposite the differential carrier 42.

The gear reduction module 30, if provided, may transmit torque between the torque source 28 and the differential assembly 22. As such, the gear reduction module 30 may operatively connect the torque source 28 and the differential assembly 22. The gear reduction module 30 may include one or more gear sets. A gear set may have any suitable configuration. For instance, a gear set may be provided with a countershaft arrangement, an epicyclic gear set arrangement, or the like. In FIG. 2, an example of an epicyclic gear set arrangement is shown in which one or more planet gears 150 may mesh with and revolve or rotate about a central sun gear 152 and may also mesh with a planetary ring gear 154, which may be stationary. Each planet gear 150 may be rotatable about a corresponding axis that may be positioned at a constant or substantially constant radial distance from the axis about which the central sun gear 152 rotates. The planet gears 150 may be rotatably supported on a planet gear carrier 156 that may be connectable to the drive pinion 26, such as with a clutch 158. Torque may be transmitted between the torque source 28 and the drive pinion 26 via the one or more gear sets of the gear reduction module 30. Torque transmission may be bidirectional when the torque source 28 includes an electric motor. For instance, torque may be transmitted from the electric motor module to the drive pinion 26 for vehicle propulsion and may be transmitted from the drive pinion 26 to the electric motor module under various operating conditions, such as during regenerative braking.

Referring to FIGS. 2 and 3, the lubricant deflector 32 is mounted to the differential carrier 42. For instance, the lubricant deflector 32 may be mounted to the side 66 of the differential carrier 42 that faces toward the differential assembly 22.

The lubricant deflector 32 directs lubricant 56 that is splashed or sprayed by the ring gear 100 of the differential assembly 22 into the lubricant passage 64 of the differential carrier 42. The lubricant deflector 32 may help capture splashed or sprayed lubricant when the differential assembly 22 rotates about the differential axis 90 in either a clockwise or counterclockwise direction from the perspective shown in FIG. 2. However, the lubricant deflector 32 may be particularly helpful in helping capture and redirect splashed or sprayed lubricant 56 when the differential assembly 22 is rotating in a first rotational direction or a counterclockwise direction from the perspective shown in FIG. 2. When the differential assembly 22 is rotating in a counterclockwise direction from the perspective shown, the teeth of the ring gear 100 rotate out of the sump portion 54, then into engagement with the drive pinion 26, then disengage the drive pinion 26, and then rotate toward the lubricant deflector 32. As a result, less lubricant 56 may be splashed or sprayed toward the lubricant passage 64 when the differential assembly 22 rotates in the counterclockwise direction as compared to a clockwise direction due to various factors, such as differences in the trajectories in which lubricant 56 is splashed or sprayed, interference caused by the drive pinion 26, or the like. The lubricant deflector 32 helps capture and direct more lubricant 56 into the lubricant passage 64 as compared to a configuration in which the lubricant deflector 32 is not provided. As a result, more lubricant 56 is provided to the drive pinion 26, gear reduction module 30 and other rotating components when the lubricant deflector 32 is provided.

Referring to FIG. 3, a side view of the differential carrier 42 is shown with the differential assembly 22 omitted to better show the lubricant deflector 32. As shown in FIG. 3, the lubricant deflector 32 is positioned above the drive pinion 26 and the axis 70 and is generally positioned in front of the lubricant passage 64. The lubricant deflector 32 is laterally offset with respect to the axis 70 such that the lubricant deflector 32 is generally aligned with the ring gear 100, which is located to the left of the axis 70 and approximately centered between the bearing supports 60 that rotatably support the differential assembly 22.

Figure 4:
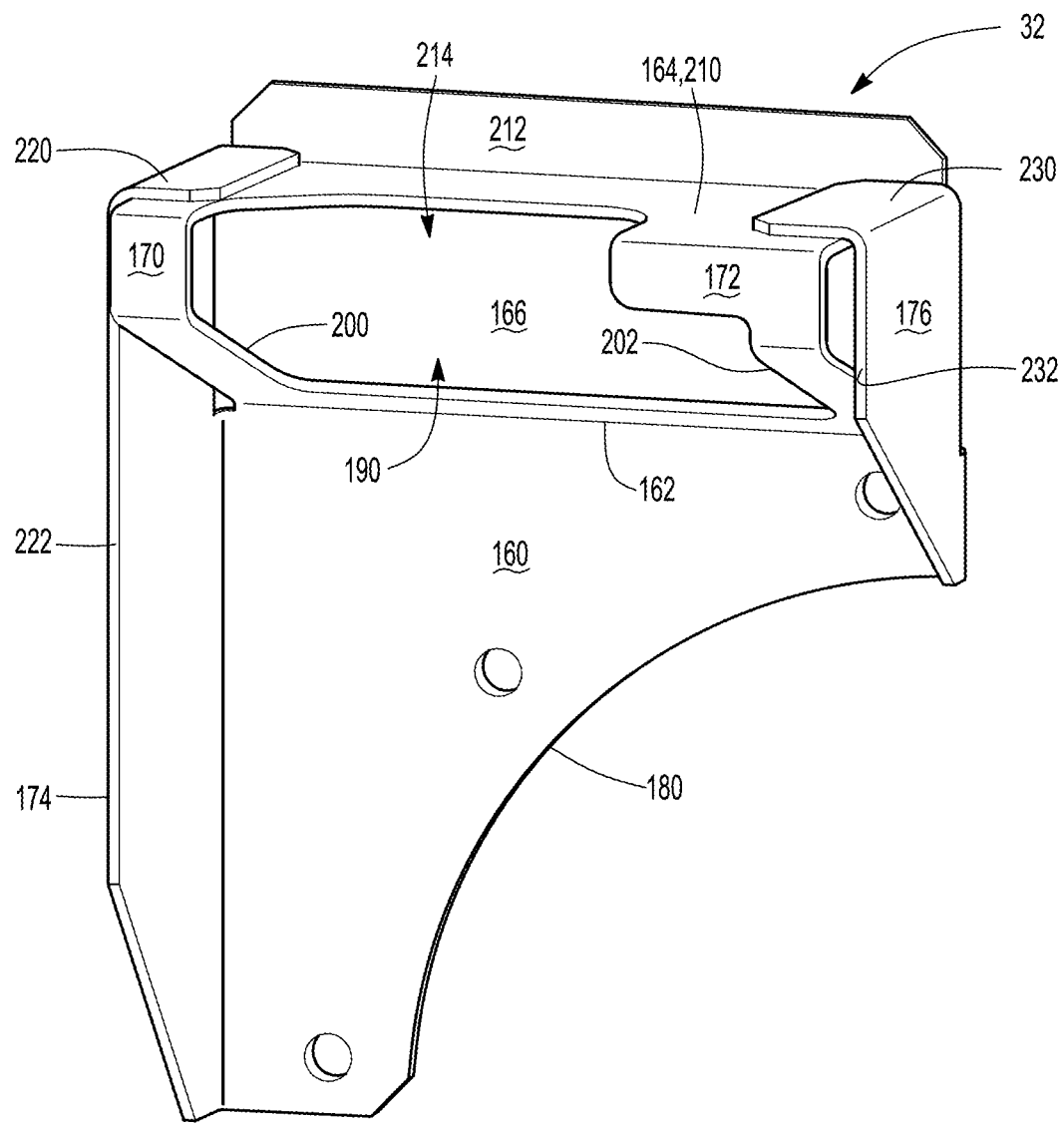
FIGS. 4 and 5 are perspective views of the lubricant deflector.
Figure 5:
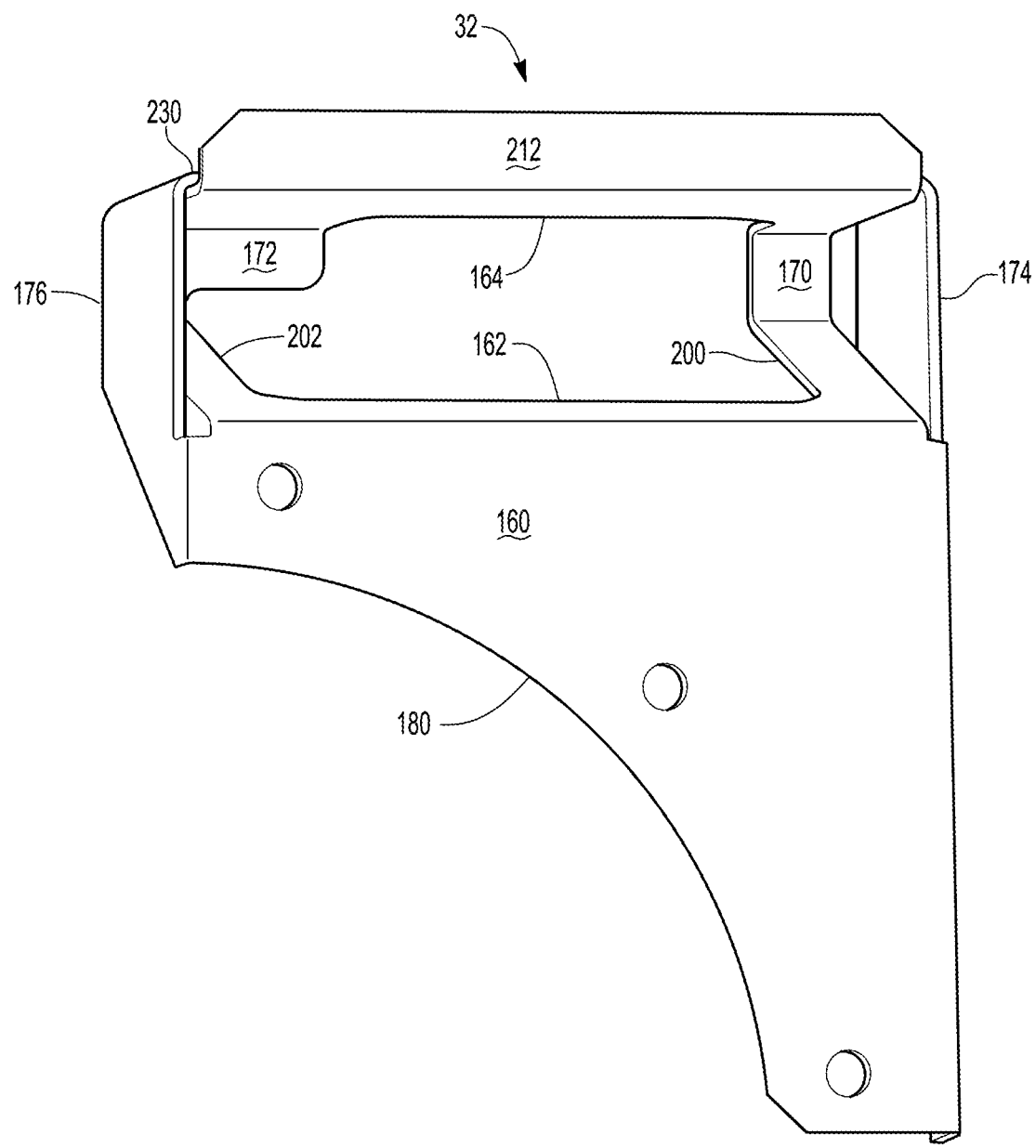

Referring primarily to FIGS. 4 and 5, an example of the lubricant deflector 32 is shown. In at least one configuration, the lubricant deflector 32 may include a first panel 160, a second panel 162, and an upper panel 164. An aperture 166 may be located between the second panel 162 and the upper panel 164 through which lubricant 56 may pass. The lubricant deflector 32 may also include a first connecting arm 170, a second connecting arm 172, a first side panel 174, and a second side panel 176.

Referring to FIGS. 3-5 the first panel 160 is mountable to the differential carrier 42. For instance, the first panel 160 may have one or more fastener holes through which a fastener, such as a bolt, may extend to secure the lubricant deflector 32 to the differential carrier 42. The first panel 160 may have an arcuate edge 180. The arcuate edge 180 may be radially disposed with respect to the axis 70.

The second panel 162 may extend at an oblique angle with respect to the first panel 160. In addition, the second panel 162 may extend in a direction that extends upward and away from the drive pinion 26. The second panel 162 may define an opening 190 into which the ring gear 100 may extend. This is best understood with reference to FIG. 2 in which the ring gear 100 is positioned behind a second arm 202 and hence in the opening 190 from the perspective shown. The ring gear 100 may pass through the opening 190 when the differential assembly 22 rotates about the differential axis 90. In at least one configuration, the second panel 162 may include a first arm 200 and the second arm 202.

Referring primarily to FIGS. 4 and 5, the first arm 200 may be disposed proximate the first side panel 174. The first arm 200 may extend in an upward direction from the first panel 160.

The second arm 202 may be disposed proximate the second side panel 176. The second arm 202 may extend in an upward direction from the first panel 160. The second arm 202 may be remotely positioned from the first arm 200 and may be spaced apart from the first arm 200. The second arm 202 may be disposed opposite the first arm 200 and may partially define the opening 190.

The upper panel 164 may be disposed above the second panel 162. In at least one configuration, the upper panel 164 may be spaced apart from the second panel 162. In at least one configuration, the upper panel 164 may be disposed substantially parallel to the axis 70. The upper panel 164 includes an upper side 210, a flange 212, and an upper opening 214.

The upper side 210 may face away from the drive pinion 26 and the second panel 162. As such, the upper side 210 may face away from the sump portion 54.

The flange 212 may be disposed at an end of the upper panel 164 that is disposed adjacent to the differential carrier 42. For instance, the flange 212 may extend from an end of the upper panel 164 that is disposed opposite the first connecting arm 170 and the second connecting arm 172. The flange 212 may extend away from the first panel 160 or in an upward direction from the perspective shown in FIG. 2.

The upper opening 214 is disposed above the opening 190 in the second panel 162. The ring gear 100 may extend through the upper opening 214 and pass through the upper opening 214 when the differential assembly 22 rotates about the differential axis 90.

The first connecting arm 170 may extend from an end of the first arm 200 to the upper panel 164. The first connecting arm 170 may extend in a generally vertical direction. In at least one configuration, the first connecting arm 170 may be disposed substantially perpendicular to the upper panel 164 and may be disposed at an oblique angle with respect to the first arm 200 of second panel 162. The first connecting arm 170 may be disposed substantially parallel to the first panel 160.

The second connecting arm 172 may extend from an end of the second arm 202 to the upper panel 164. The second connecting arm 172 may extend in a generally vertical direction. In at least one configuration, the second connecting arm 172 may be disposed substantially perpendicular to the upper panel 164 and may be disposed at an oblique angle with respect to the second arm 202 of the second panel 162. The second connecting arm 172 may be disposed substantially parallel to the first panel 160. The second connecting arm 172 may be aligned with and may be coplanar with the first connecting arm 170 in one or more configurations. The second connecting arm 172 may have a different configuration than the first connecting arm 170. For instance, the second connecting arm 172 may have a greater width than the first connecting arm 170 as is best shown in FIG. 4. The ring gear 100 may be positioned in the upper opening 214 between the first connecting arm 170 and the second connecting arm 172.

The first side panel 174 may extend from the first panel 160 in a direction that extends toward the differential assembly 22. As such, the first side panel 174 may extend away from the side 66 of the differential carrier 42 and away from the lubricant passage 64. The first side panel 174 may help capture lubricant 56 that is splashed or sprayed by the ring gear 100 and direct lubricant toward the aperture 166 located between the second panel 162 and the upper panel 164. The first side panel 174 may extend in a substantially vertical direction from a first lateral end of the first panel 160. The first side panel 174 may extend from the bottom of the first panel 160 in an upward direction past the second panel 162 and to the upper panel 164. In at least one configuration, the first side panel 174 may contact the upper panel 164. The first side panel 174 may include a first tab 220 that may extend over and may contact or engage an upper side 210 of the upper panel 164. The first side panel 174 may have a first distal end 222 that is disposed opposite the first panel 160. The first connecting arm 170 may be positioned farther from the first panel 160 than the first distal end 222 is positioned from the first panel 160.

The second side panel 176 may be disposed opposite the first side panel 174. The second side panel 176 may extend from the first panel 160 in a direction that extends toward the differential assembly 22. As such, the second side panel 176 may extend away from the side 66 of the differential carrier 42 and away from the lubricant passage 64. The second side panel 176 may help capture lubricant 56 that is splashed or sprayed by the ring gear 100 and direct lubricant toward the aperture 166. The second side panel 176 may extend in a substantially vertical direction from a second lateral end of the first panel 160 that may be disposed opposite the first lateral end and the first side panel 174. The second side panel 176 may extend from the bottom of the first panel 160 in an upward direction past the second panel 162 and to the upper panel 164. In at least one configuration, the first side panel 174 may contact the upper panel 164. For instance, the second side panel 176 may extend from the arcuate edge 180 of the first panel 160. The second side panel 176 may include a second tab 230 that may extend over and may contact or engage an upper side 210 of the upper panel 164. The second side panel 176 may have a second distal end 232 that is disposed opposite the first panel 160. The second connecting arm 172 may be positioned further from the first panel 160 than the second distal end 232 is positioned from the first panel 160.

The aperture 166 may be positioned between the second panel 162 and the upper panel 164. In addition the aperture 166 may be laterally positioned between the first side panel 174 and the second side panel 176. Lubricant 56 may pass through the aperture 166 to reach and enter the lubricant passage 64.

Referring to FIG. 2, the straight arrowed lines represent how lubricant 56 may be deflected by the lubricant deflector 32 through the aperture 166 and into the lubricant passage 64. For instance, lubricant 56 is flung or splashed by drive pinion 26, the ring gear 100, or both may be directed upward toward the lubricant deflector 32 when the lubricant deflector 32 is rotating in a counterclockwise direction from the perspective shown. The lubricant 56 may pass directly through the aperture 166 or may be redirected toward the aperture 166 by the lubricant deflector 32. For instance, lubricant 56 may bounce off or may be redirected by the upper panel 164, the first side panel 174, the second side panel 176, the second panel 162, or combinations thereof to direct lubricant 56 through the aperture 166 and into the lubricant passage 64 to help lubricate rotating components as previously discussed. Lubricant 56 may flow back to the sump portion 54 under the force of gravity to facilitate recirculation of the lubricant 56.

An axle assembly as described above may help direct sprayed or splashed lubricant into a lubricant passage of the differential carrier. Thus, the lubricant deflector may help better capture lubricant when the ring gear is rotating in a first rotational direction as previously discussed. As a result, the present invention solves problems associated with providing an adequate lubricant to rotating components, such as the gear reduction module and bearing assemblies that support rotating component such as the drive pinion, when a differential carrier is configured as described above. In addition, the present invention helps improve lubricant circulation, which may facilitate heat transfer and help avoid overheating of rotating components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
a housing assembly that includes an axle housing and a differential carrier that is mounted to the axle housing and that defines a lubricant passage, wherein the axle housing and the differential carrier cooperate to define a sump portion that receives lubricant;
a differential assembly that is mounted to the differential carrier and that is rotatable about a differential axis, the differential assembly having a ring gear;
a drive pinion that meshes with the ring gear; and
a lubricant deflector that is mounted to the differential carrier, wherein the lubricant deflector directs lubricant that is splashed or sprayed by the ring gear into the lubricant passage, and the lubricant deflector has a first panel that is mounted to the differential carrier and a second panel that extends at an oblique angle with respect to the first panel in a direction that extends away from the drive pinion.

2. The axle assembly of claim 1 wherein the lubricant deflector directs lubricant that is splashed or sprayed by the ring gear into the lubricant passage when the differential assembly rotates about the differential axis in a first rotational direction in which teeth of the ring gear rotate from the sump portion, then into engagement with the drive pinion, then disengage the drive pinion, and then rotate toward the lubricant deflector.

3. The axle assembly of claim 1 wherein the drive pinion is rotatable about an axis and the lubricant deflector is positioned above the axis.

4. The axle assembly of claim 1 wherein the drive pinion is rotatable about an axis and the first panel has an arcuate edge that is radially disposed with respect to the axis.

5. The axle assembly of claim 1 wherein the drive pinion is rotatable about an axis and the first panel has an arcuate edge.

6. An axle assembly comprising:
a housing assembly that includes an axle housing and a differential carrier that is mounted to the axle housing and that defines a lubricant passage, wherein the axle housing and the differential carrier cooperate to define a sump portion that receives lubricant;

a differential assembly that is mounted to the differential carrier and that is rotatable about a differential axis, the differential assembly having a ring gear;

a drive pinion that meshes with the ring gear; and a lubricant deflector that is mounted to the differential carrier, wherein the lubricant deflector directs lubricant that is splashed or sprayed by the ring gear into the lubricant passage, the lubricant deflector has a first panel that is mounted to the differential carrier and a second panel that extends at an oblique angle with respect to the first panel in a direction that extends away from the drive pinion, and the second panel defines an opening through which the ring gear passes when the differential assembly rotates.

7. The axle assembly of claim 6 wherein the second panel has a first arm and a second arm that is remotely positioned from the first arm, wherein the first arm and the second arm are disposed opposite each other and partially define the opening.

8. The axle assembly of claim 7 wherein the lubricant deflector has an upper panel that is disposed above the second panel.

9. The axle assembly of claim 8 wherein the upper panel is spaced apart from the second panel.

10. The axle assembly of claim 9 wherein the lubricant deflector has a first connecting arm that extends from an end of the first arm to the upper panel.

11. The axle assembly of claim 10 wherein the lubricant deflector has a second connecting arm that extends from an end of the second arm to the upper panel.

12. The axle assembly of claim 11 wherein the ring gear is positioned between the first connecting arm and the second connecting arm.

13. The axle assembly of claim 11 wherein the first panel is disposed substantially parallel to the first connecting arm and the second connecting arm.

14. The axle assembly of claim 11 wherein the upper panel has a flange that extends away from the first panel from an end of the upper panel that is disposed opposite the first connecting arm and the second connecting arm.

15. The axle assembly of claim 10 wherein the lubricant deflector has a first side panel that extends from the first panel in a direction that extends away from the lubricant passage of the differential carrier, wherein the first side panel contacts the upper panel.

16. The axle assembly of claim 15 wherein the first side panel has a first distal end that is disposed opposite the first panel, and the first connecting arm is positioned farther from the first panel than the first distal end is positioned from the first panel.

17. The axle assembly of claim 15 wherein the first side panel has a first tab that engages an upper side of the upper panel that faces away from the drive pinion.

18. The axle assembly of claim 6 wherein the lubricant deflector has an upper panel that is disposed above the second panel, a first side panel, and a second side panel that is disposed opposite the first side panel and that extends from the first panel in a direction that extends away from the lubricant passage of the differential carrier, wherein the second side panel contacts the upper panel.

19. The axle assembly of claim 18 wherein the second side panel has a second tab that engages an upper side of the upper panel that faces away from the drive pinion.

20. The axle assembly of claim 18 wherein the first panel has an arcuate edge and the second side panel extends from the arcuate edge.

\* \* \* \* \*